(12) United States Patent
Ibrahim et al.

(10) Patent No.: US 9,516,147 B2
(45) Date of Patent: Dec. 6, 2016

(54) SINGLE PASS/SINGLE COPY NETWORK ABSTRACTION LAYER UNIT PARSER

(71) Applicant: MICROSOFT TECHNOLOGY LICENSING, LLC, Redmond, WA (US)

(72) Inventors: Ziyad Ibrahim, Redmond, WA (US); Yongjun Wu, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 155 days.

(21) Appl. No.: 14/529,124

(22) Filed: Oct. 30, 2014

(65) Prior Publication Data

US 2016/0127518 A1    May 5, 2016

(51) Int. Cl.
| | | |
|---|---|---|
| H04L 12/28 | (2006.01) | |
| H04L 29/06 | (2006.01) | |
| H04L 12/861 | (2013.01) | |
| H04L 12/939 | (2013.01) | |
| H04N 21/44 | (2011.01) | |

(52) U.S. Cl.
CPC ............. *H04L 69/22* (2013.01); *H04L 49/552* (2013.01); *H04L 49/9057* (2013.01); *H04N 21/44004* (2013.01); *H04N 21/44008* (2013.01)

(58) Field of Classification Search
CPC .. H04L 49/357; H04N 19/1883; H04N 19/172
USPC ........................................................ 370/394
See application file for complete search history.

(56) References Cited

U.S. PATENT DOCUMENTS

| | | | | |
|---|---|---|---|---|
| 4,797,851 A | * | 1/1989 | Suzuki | G06F 13/28 360/49 |
| 7,436,328 B2 | | 10/2008 | Zhou | |
| 7,706,662 B2 | | 4/2010 | Toma et al. | |
| 7,848,407 B2 | | 12/2010 | Yoon | |
| 7,924,928 B2 | | 4/2011 | Mori et al. | |
| 8,731,067 B2 | | 5/2014 | Wu et al. | |
| 8,767,818 B2 | | 7/2014 | Hannuksela et al. | |
| 2007/0006020 A1 | * | 1/2007 | Fujita | G06F 3/0613 714/6.11 |
| 2009/0003429 A1 | | 1/2009 | Chang | |
| 2009/0080511 A1 | | 3/2009 | Li | |

(Continued)

FOREIGN PATENT DOCUMENTS

| | | |
|---|---|---|
| EP | 2 469 858 A2 | 6/2012 |
| WO | 2013153226 | 10/2013 |

OTHER PUBLICATIONS

PCT International Search Report and Written Opinion for Application No. PCT/US2015/056122, Jan. 26, 2016.

(Continued)

*Primary Examiner* — Wei Zhao
(74) *Attorney, Agent, or Firm* — Sunah Lee; Dan Choi; Micky Minhas

(57) ABSTRACT

Technologies for a single-pass/single copy network abstraction layer unit ("NALU") parser. Such a NALU parser typically reuses source and/or destination buffers, optionally changes endianess of NALU data, optionally processes emulation prevention codes, and optionally processes parameters in slice NALUs, all as part of a single pass/single copy process. The disclosed NALU parser technologies are further suitable for hardware implementation, software implementation, or any combination of the two.

20 Claims, 12 Drawing Sheets

(56) References Cited

U.S. PATENT DOCUMENTS

| | | |
|---|---|---|
| 2009/0175353 A1 | 7/2009 | Suh et al. |
| 2009/0323826 A1 | 12/2009 | Wu et al. |
| 2010/0189182 A1 | 7/2010 | Hannuksela |
| 2012/0147973 A1 | 6/2012 | Wu et al. |
| 2013/0215978 A1 | 8/2013 | Wu et al. |
| 2014/0092993 A1 | 4/2014 | Wang |
| 2014/0317444 A1* | 10/2014 | Kushihara ............. G06F 3/0653 714/6.22 |

OTHER PUBLICATIONS

Jo, et al., "Bitstream decoding processor for fast entropy decoding of variable length coding-based multiformat iideos", Published in SPIE, Optical Engineering, vol. 53, Issue 6, Jun. 5, 2014, (13 Pages total).

Second Written Opinion Issued in PCT Application No. PCT/US2015/056122, Mailed Date: Sep. 20, 2016, (8 Pages Total).

* cited by examiner

SINGLE PASS/SINGLE COPY NETWORK ABSTRACTION LAYER UNIT PARSER

BACKGROUND

Efficient and performant processing of media data is essential for a high-quality user experience and for low power consumption. Conventional modules and their techniques for parsing network abstraction layer units that make multiple passes over NALU data and/or make multiple copies of the NALU data can reduce efficiency and performance, contributing to a low-quality user experience and to low power consumption.

SUMMARY

The summary provided in this section summarizes one or more partial or complete example embodiments of the technologies described herein in order to provide a basic high-level understanding to the reader. This summary is not an extensive description of the technologies and it may not identify key elements or aspects of the technologies, or delineate the scope of the technologies. Its sole purpose is to present various aspects of the technologies in a simplified form as a prelude to the detailed description provided below. The technologies as a whole shall not be limited to any particular embodiment(s) or example(s) or combination(s) therefore provided herein.

Described herein are technologies for a single-pass/single copy network abstraction layer unit ("NALU") parser. Such a NALU parser typically reuses source and/or destination buffers, optionally changes endianess of NALU data, optionally processes emulation prevention codes, and optionally processes parameters in NALUs including slice NALUs, all as part of a single pass/single copy process. The disclosed NALU parser technologies are further suitable for hardware implementation, software implementation, or any combination of the two.

Many of the attendant features will be more readily appreciated as the same become better understood by reference to the detailed description provided below in connection with the accompanying drawings.

DESCRIPTION OF THE DRAWINGS

The detailed description provided below will be better understood when considered in connection with the accompanying drawings, where:

FIG. 6 is a block diagram showing an example method for initializing various data elements of example parser or the like.

Like-numbered labels in different figures are used to designate similar or identical elements or steps in the accompanying drawings.

DETAILED DESCRIPTION

The detailed description provided in this section, in connection with the accompanying drawings, describes one or more partial or complete example embodiments of the technologies, but is not intended to describe all possible embodiments of the technologies. This detailed description sets forth various examples of at least some of the systems and/or methods of the technologies. However, the same or equivalent technologies, systems, and/or methods may be realized according to examples as well.

Computing Environments

Although the examples provided herein are described and illustrated as being implementable in a computing environment, the environment described is provided only as an example and not a limitation. As those skilled in the art will appreciate, the examples disclosed are suitable for implementation in a wide variety of different computing environments.

Figure 1:
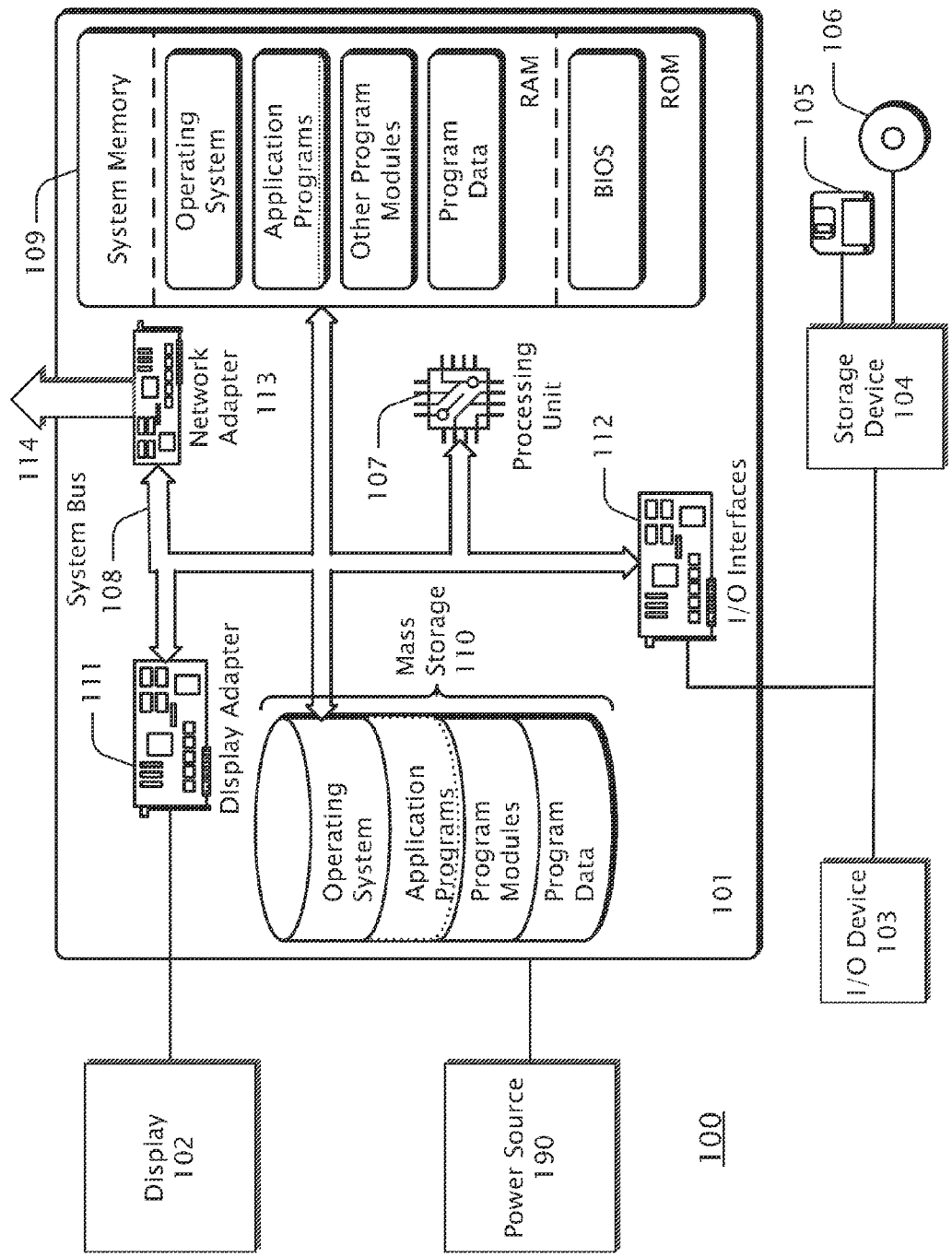
FIG. 1 is a block diagram showing an example computing environment in which the technologies described herein may be implemented.

FIG. 1 is a block diagram showing an example computing environment 100 in which the technologies described herein may be implemented. A suitable computing environment may be implemented with any of numerous general purpose or special purpose devices and/or systems. Examples of well-known device/systems include, but are not limited to personal digital assistants ("PDA"), personal computers ("PC"), hand-held or laptop computing devices, microprocessor-based systems, multiprocessor systems, systems on a chip ("SOC"), servers, Internet services, workstations, consumer electronic devices, cell phones, set-top boxes, gaming systems, casting systems, various media and entertainment systems, and the like. In all cases, such systems are strictly limited to being articles of manufacture and the like.

Computing environment 100 typically includes a general-purpose computing system in the form of a computing device 101 coupled to various components, such as peripheral devices 102, 103, 101 and the like. These may include components such as input devices 103 such as voice recognition technologies, touch pads, buttons, keyboards and/or pointing devices, such as a mouse or trackball, that may operate via one or more input/output ("I/O") interfaces 112. The components of computing device 101 may include one or more processors (including central processing units ("CPU"), graphics processing units ("GPU"), microprocessors ("μP"), and the like) 107, system memory 109, and a system bus 108 that typically couples the various components. Processor(s) 107 typically processes or executes various computer-executable instructions and, based on those instructions, controls the operation of computing device 101. This may include the computing device 101 communicating with other electronic and/or computing devices, systems or environments (not shown) via various communications technologies such as a network connection 114 or the like. System bus 108 represents any number of bus structures, including a memory bus or memory controller, a peripheral bus, a serial bus, an accelerated graphics port, a processor or local bus using any of a variety of bus architectures, and the like. The term "computing device" as used herein, unless preceded with the word "virtual", refers strictly to an article (s) of manufacture and the like. The terms "virtual computing device" and "virtual machine" typically refer to an emulation of a particular computing system and are commonly referred to as a virtual machine ("VM"). Such VMs, to be operational, are always hosted on a non-virtual computing device(s).

System memory 109 may include computer-readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 109 typically stores data, computer-executable instructions and/ or program modules comprising computer-executable instructions that are immediately accessible to and/or presently operated on by one or more of the processors 107. The term "system memory" as used herein refers strictly to an article(s) of manufacture and the like.

Mass storage devices 104 and 110 may be coupled to computing device 101 or incorporated into computing device 101 via coupling to the system bus. Such mass storage devices 104 and 110 may include non-volatile RAM, a magnetic disk drive which reads from and/or writes to a removable, non-volatile magnetic disk (e.g., a "floppy disk") 105, and/or an optical disk drive that reads from and/or writes to a non-volatile optical disk such as a CD ROM, DVD ROM 106. Alternatively, a mass storage device, such as hard disk 110, may include non-removable storage medium. Other mass storage devices may include memory cards, memory sticks, tape storage devices, and the like. The term "mass storage device" as used herein refers strictly to an article(s) of manufacture and the like.

Any number of computer programs, files, data structures, and the like may be stored in mass storage 110, other storage devices 104, 105, 106 and system memory 109 (typically limited by available space) including, by way of example and not limitation, operating systems, application programs, data files, directory structures, computer-executable instructions, and the like.

Output components or devices, such as display device 102, may be coupled to computing device 101, typically via an interface such as a display adapter 111. Output device 102 may be a liquid crystal display ("LCD"). Other example output devices may include printers, audio outputs, voice outputs, cathode ray tube ("CRT") displays, tactile devices or other sensory output mechanisms, or the like. Output devices may enable computing device 101 to interact with human operators or other machines, systems, computing environments, or the like. A user may interface with computing environment 100 via any number of different I/O devices 103 such as a touch pad, buttons, keyboard, mouse, joystick, game pad, data port, and the like. These and other I/O devices may be coupled to processor(s) 107 via I/O interfaces 112 which may be coupled to system bus 108, and/or may be coupled by other interfaces and bus structures, such as a parallel port, game port, universal serial bus ("USB"), fire wire, infrared ("IR") port, and the like.

Computing device 101 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 101 may be coupled to a network via a network adapter 113 or the like, or, alternatively, via a modem, digital subscriber line ("DSL") link, integrated services digital network ("ISDN") link, Internet link, wireless link, or the like.

Communications connection 114, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 190, such as a battery or a power supply, typically provides power for portions or all of computing environment 100. In the case of the computing environment 100 being a mobile device or portable device or the like, power source 190 may be a battery. Alternatively, in the case computing environment 100 is a desktop computer or server or the like, power source 190 may be a power supply designed to connect to an alternating current ("AC") source, such as via a wall outlet.

Some mobile devices may include only a few of the components described in connection with FIG. 1. For example, an electronic badge may be comprised of a coil of wire or the like along with a simple processing unit 107 or the like, the coil configured to act as power source 190 when in proximity to a card reader device or the like. Such a coil may also be configured to act as an antenna coupled to the processing unit 107 or the like, the coil antenna capable of radiating/receiving communications between the electronic badge and another device such as a card reader device. Such communications may not involve networking, but may alternatively be general or special purpose communications via telemetry, point-to-point, RF, IR, audio, or other means. An electronic card may not include display 102, I/O device 103, or many of the other components described in connection with FIG. 1. Other mobile devices that may not include many of the components described in connection with FIG. 1, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, program modules, or the like maintained in an electronic device such as a ROM. The term "software" generally refers to computer-executable instructions, code, data, applications, programs, program modules, or the like maintained in or on any form or type of computer-readable media that is configured for storing computer-executable instructions or the like in a manner that is accessible to a computing device. The terms "computer-readable medium", "computer-readable media", and the like as used herein are limited to referring strictly to one or more statutory apparatus, article of manufacture, or the like that is not a signal or carrier wave per se. The term "computing device" as used in the claims is limited to referring strictly to one or more statutory apparatus, article of manufacture, or the like that is not a signal or carrier wave per se, such as an electronic circuit, chip, hardware module, or the like, and/or a computing device such as computing device 101 that encompasses client devices, mobile devices, one or more servers, network services such as an Internet services or corporate network services based on one or more computers, and the like, and/or any combination thereof.

Digital Media Pipeline

Figure 2:
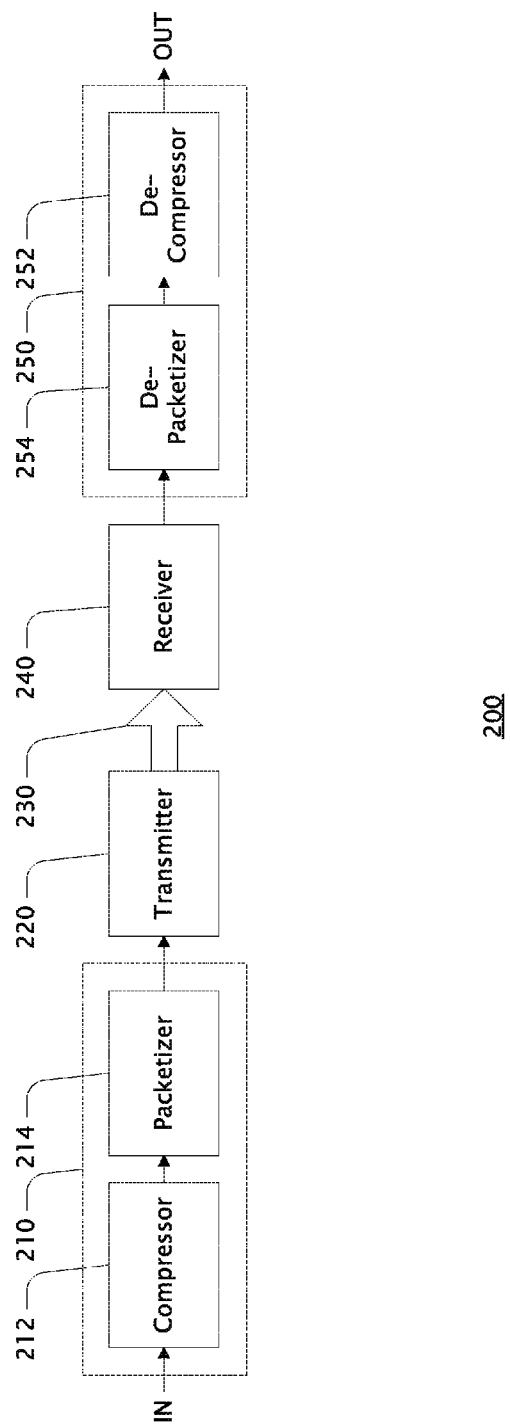
FIG. 2 is a block diagram showing an example system configured for generating, transporting, and rendering digital media.

FIG. 2 is a block diagram showing an example system 200 configured for generating, transporting, and rendering digital media. System 200 may be an example of a digital media pipeline. Such a system may include various other modules in addition to those illustrated. The term "media" as used herein typically refers to audio, video, images, and the like, may include "multimedia" which is any combination of the foregoing and/or the like, and is distinguished from the "computer-readable media" and "communications media" defined previously. The term "digital media" and the like as used herein refers to media that is digitized using digital encoding/compression techniques. For example, the input (IN) to system 200 may be provided by a camera(s), video camera(s), microphone(s), and/or the like. The output (OUT) from system 200 may be decoded digital audio renderable (perhaps with additional processing) by an amplifier and speakers or the like, or a decoded digital image or decoded digital video renderable (perhaps with additional processing) on a display, printer, other output device(s), and/or the like. In general, the output may be some form or representation of at least a portion of the input.

Example system 200 typically includes example compressor 212 and example packetizer 214 that may be separate and distinct, or part of a codec 210 or the like. Compressor 212 typically digitizes input media resulting in an encoded and/or compressed version of the input. As used herein, the various forms of the terms "encoded", "compressed", and "digitized" are generally used interchangeably herein excepted as noted. In one example, compressor 212 digitizes continuous input media into frames and/or samples. Then packetizer 214 packetizes the frames/samples provided by compressor 212 by taking portions (e.g., slices) of the frames/samples and structuring the portions in discrete units of digital media known herein as digital media units (DMUs). One particular class of DMUs is known as network abstraction layer units (NALUs). The terms "digital media stream" and "media stream" as used herein are generally used interchangeably and refer to an essentially steady and continuous stream of digital media in some form (e.g., encoded, in DMUs, DMTP, and/or the like), typically with a particular beginning point and/or ending. The various forms of the term "streaming" as used herein generally refer to the essentially steady and continuous sending and/or broadcasting of media stream data (i.e., digital media).

Once media is digitized and packetized, it may be further processed by example transmitter 220 for transmission, transport, storage, and/or the like. In one example, transmitter 220 may wrap DMUs in various containers or the like, add various headers or the like, resulting in digital media transmission packets (DMTPs), and then send 230 such DMTPs over a network(s) or the like 230 to a receiver(s), such as receiver 240. Such a network may be the Internet, local area networks (LANs), wide area networks (WANs), wireless networks, and/or any other type of network over which DMTPs may be transported or streamed. In another example, transmitter 220 may structure DMUs in the form of a file that can be handled by a file system or the like. Such handling may include manipulating, storing, retrieving, streaming, and any other file system operation that can be performed on a file. Transmitter 220 may also provide 230 such a file to a file system or the like. In general, transmitter 220 may transmit digital media in any form(s) to any source(s). Various examples of transmitter 220 may include and/or operate with a network interface card(s) (NIC), a radio(s), a file system(s), other devices/systems/services, and/or the like.

Example receiver 240 typically receives 230 some form of digital media (e.g., encoded, in DMUs, DMTP, and/or the like) from some source(s). In one example, such digital media may be received in the form of a file from a file system. In another example, such digital media may be received in the form of DMTPs over a network(s). In general, receiver 240 may receive digital media in any form(s) from any source(s). Receiver 240 typically processes DMTPs by unwrapping DMUs from any container(s) they were wrapped in and removes any added headers or the like, resulting in DMUs. Various examples of receiver 240 may include and/or operate with a network interface card(s) (NIC), a radio(s), a file system(s), other devices/systems/services, and/or the like.

Example de-packetizer 254 and example de-compressor 252 may be separate and distinct, or part of a codec 250 or the like. De-packetizer 254 and its functions are described in connection with FIGS. 4-6. At a high level, de-packetizer 254 coverts a fragmented stream of NALU data into whole NALUs in buffers that are provided to de-compressor 212 that typically decompresses re-created frames/samples resulting in a decoded and/or de-compressed media provided as output (OUT). In one example, the generated representations may be identical or essentially identical to the frames/samples digitized by compressor 212. As used herein, the various forms of the terms "decoded" and "decompressed" are generally used interchangeably excepted as noted. In one example, codecs 210 and 250 may be the same codec and include each of modules 212, 214, 252, and 254.

In one example, codec 210 and/or 250 may be implemented in software, in hardware, or any combination of the two. For example, de-packetizer 254 may be implemented in software while de-compressor 252 may be implemented in hardware, or vise-versa. In another example, portions of de-packetizer 254 may be implemented in software while other portions may be implemented in hardware.

Network Abstraction Layer Units

Figure 3:
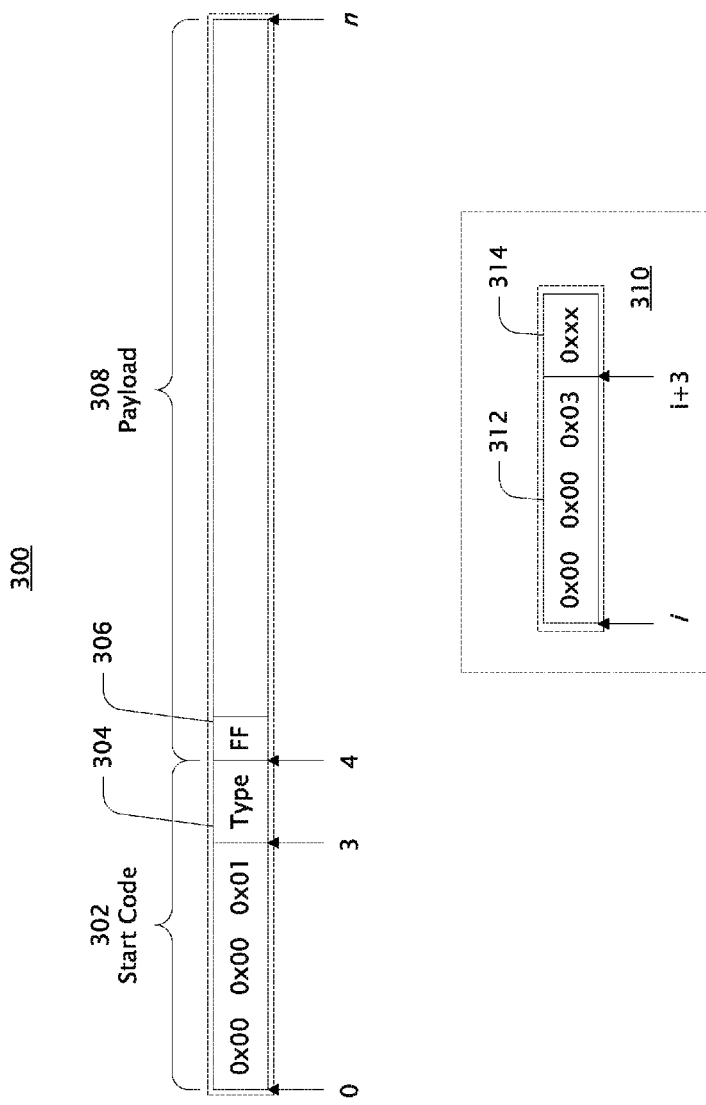
FIG. 3 is a diagram illustrating an example structure of a NALU.

FIG. 3 is a diagram illustrating an example structure 300 of a NALU. Structure 300 comprises 0 through n bytes and is n+1 bytes in length. In an actual NALU, the values of the first three bytes are typically set to 0x00 (byte 0), 0x00 (byte 1), and 0x01 (byte 2) followed by a NALU type byte (byte 3) 304. This particular sequence of four byte values (001 plus the type byte) is known as a start code 302 that identifies the beginning of the NALU. The value of NALU type byte 304 may be one of one or more values that identify the NALU as one that includes a portion (e.g., a slice) of a frame. Other values of NALU type byte 304 may identify the NALU as one that includes data other than frame data. Beyond distinguishing between NALU types that do and do not include frame data, the particular type byte values are not important in the context of this discussion. The term "slice NALU" as used herein refers to a NALU or NALU type that includes a slice or portion of frame data, and the term "non-slice NALU" as used herein refers to a NALU or NALU type that does not include a slice or portion of frame data. The terms "start code" and "NALU start code" are generally used interchangeably herein excepted as noted. The term "byte" refers to a unit of data, or "data unit" that is 8 bits in size. Other data units include, for example words (WORD, 16 bits), dwords (DWORD, 32 bits), nibbles (4 bits), etc. In other examples, the term "byte" may be exchanged for some other data unit, such as WORD, etc. In other words, the word "byte" as used herein may, in various examples, refer to any data unit as opposed to an 8-bit value. Each particular data unit generally has a particular size that is, for example, a particular number of bits. The phrase "reading a data unit" or the like as used herein typically refers to reading a data value the size of the data unit from a source, such as a source buffer or any other source. Conversely, the phrase "writing a data unit" or the like as used herein typically refers to writing a data value the size of the data unit to a destination, such as a destination buffer or any other destination. The term "buffer" as used herein typically refers to some form and amount of memory designated as the buffer in which data units may be stored.

The value of the fifth byte (byte 4) of a slice NALU (also byte 1 of a slice NALU payload such as payload 308) typically includes frame flag (FF) 306. This flag typically indicates whether or not the NALU begins a new frame. In one example, frame flag 306 may be a single bit of byte 4, one state of which indicates that the NALU is the start of a new frame, the other state of which indicates that the NALU is not the start of a new frame. In one example, the frame flag is a single bit of the fifth byte.

Payload 308, which may comprise frame flag 306 in certain NALU types, is typically the part of the NALU immediately following start code 302, as illustrated. In some cases, payload 308 may include one or more emulation prevention codes or partial emulation prevention codes (that are split across source buffers), such as illustrated in example 310. In this example, a valid emulation prevention code comprises four bytes, the first value of which is 0x00, the second 0x00, the third 0x03, and the fourth any value. In one example, the third value (0x03) (the "added value") is inserted by packetizer 214 or the like to insure that NALU data with a value sequence of 0x00 0x00 0x01 cannot be mistaken for a NALU start code by changing this sequence to 0x00 0x00 0x03 0x01. Thus, the value of 0x03 is typically inserted after any sequence of 0x00 0x00 regardless of the value immediately following this two byte sequence. Because this extra byte value is inserted into the NALU data sequence, it generally must be removed by de-packetizer 254 or the like, such as during parsing or copying of the NALU data.

In one example, packetizer 214 packetizes the frames/samples provided by compressor 212 into slice NALUs according to structure 300 and with the following characteristics. One frame may be packetized into one or more slice NALUs. Each slice NALU that starts a new frame (and each slice NALU that does not) is typically identified by the value of its frame flag 306. Each slice NALU (that includes at least a portion of frame data) is typically identified the value of its frame type 304. The payload 308 of a slice NALU may be one or more bytes in length. Thus, an entire slice NALU may be five or more bytes in length. In one example, a NALU may include up to $2^{32}$ (i.e., 4,294,967,296) bytes of data. In another example, a NALU may include a number of bytes that is at least n times the size of a raw image, where n>1.

NALU Parser

Figure 4:
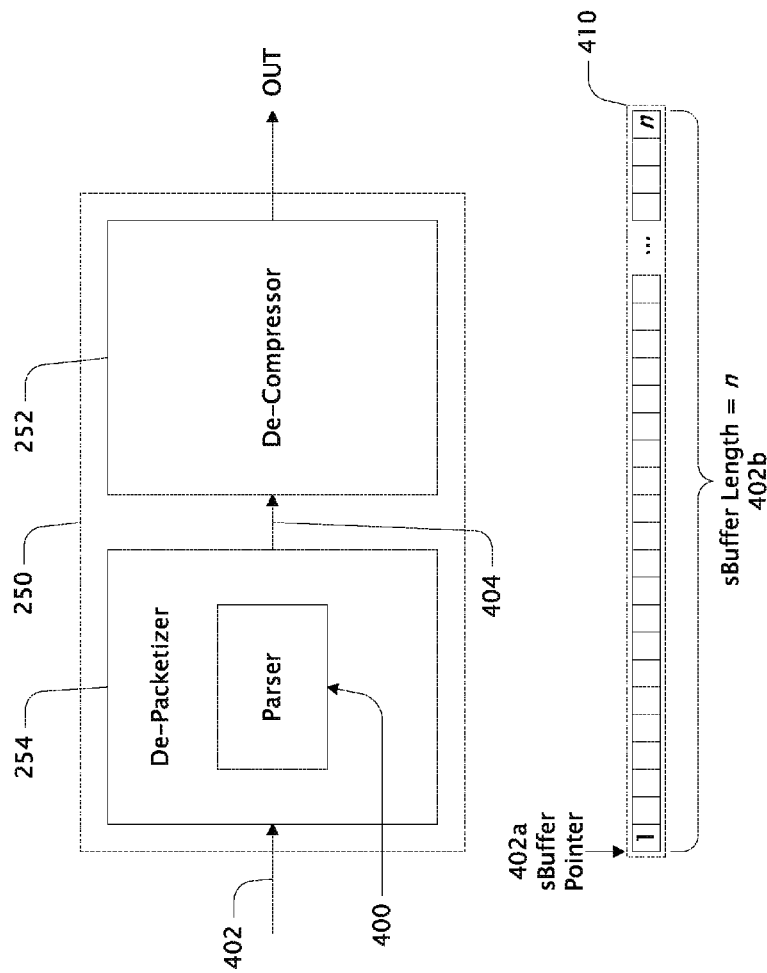
FIG. 4 is a block diagram showing an example NALU parser configured for parsing a source buffer for NALUs.

FIG. 4 is a block diagram showing an example NALU parser 400 configured for parsing a source buffer for NALUs. In one example, de-packetizer 254 includes NALU parser 400. Input 402 typically includes at least pointer 402a and length 402b. Receiver 240 typically processes DMTPs and places one or more resulting NALUs into source buffer (sBuffer) 410. Pointer 402a as provided typically points to the beginning of sBuffer 410, and length 402b as provided typically indicates the length of the one or more resulting NALUs in sBuffer 410. Further, in one example, sBuffer 410 may contain only a portion of one NALU. In another example, sBuffer 410 may contain multiple NALUs and a portion of another NALU, where the portion may be first or last in sBuffer 410. In yet another example, sBuffer 410 may contain an ending portion of one NALU followed by a beginning portion of another NALU. In one example, sBuffer may be allocated by receiver 240, and/or may be located in system memory 109 such as RAM.

Parser 400 typically processes NALU data in sBuffer 410 by parsing the NALU data and moving certain of that data from sBuffer 410 to a destination buffer(s) that is then made available 404 to de-compressor 252. Parser 400 and its operations are described further in connection with FIGS. 5 and 6. In general, parser 400 processes the NALU data in a single pass and moves the data to be made available to de-compressor 252 from the source buffer only one time. This is known herein as single pass/single copy of NALU data, and is in contrast to conventional NALU parsers that process NALU data in multiple passes while making multiple copies. Thus, NALU parser 400 tends to improve the efficiency and performance of digital media processing technologies, and also tends to improve the functionality of a computing device(s) that produces and/or renders digital media.

Figure 5:
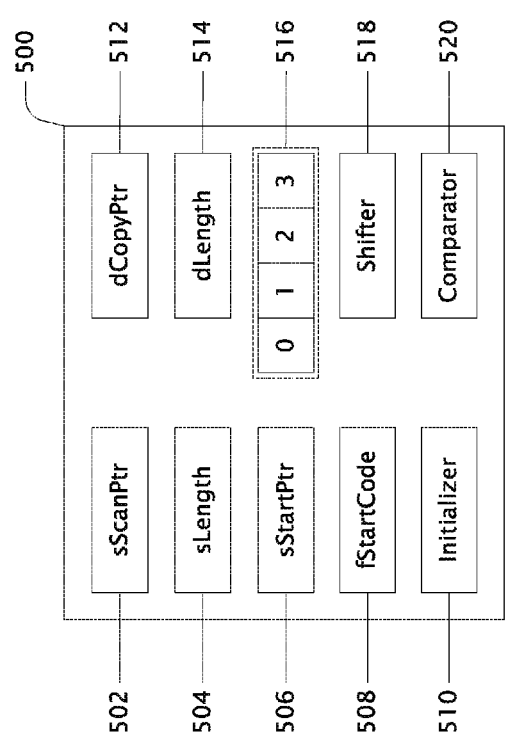
FIG. 5 is a block diagram showing an example parser module configured for parsing NALU data in a source buffer(s) and moving certain of that data to a destination buffer(s).

FIG. 5 is a block diagram showing an example parser module 500 configured for parsing NALU data in a source buffer(s) and moving certain of that data to a destination buffer(s). Further, pointers to multiple sources buffers may be sequentially provided to parser 500 and certain data from all of these buffers may be moved to the destination buffer (s). Alternatively, a portion of the data from one source buffer may be copied to a destination buffer, another portion to another destination buffer, and so on. In general, parser 500 parses a full frame of data from one or more source buffers and copies that frame data to a destination buffer(s) that is then made available to a de-compressor. Such a destination buffer(s) may be a single buffer or more than one buffer such as in an array of buffers.

Parser module 500 may be implemented in hardware, software, or in any combination thereof, and may be part of a codec. When implemented in software, parser module 500 may be considered a program module. Example parser 500 includes: source buffer scan pointer (sScanPtr) 502 that is typically used in scanning (e.g., during parsing) the bytes in a source buffer, such as sBuffer 410; source buffer length field (sLength) 504 typically holds the length of the provided source buffer, where the length indicates the number of bytes of data in the source buffer; source buffer start pointer (sStartPtr) 506 typically points to the start of data in the source buffer that is to be moved to the destination buffer; start code flag (fStartCode) 508 typically indicates whether or not parser 500 has found at least one start code since being initialized; initializer 510 is a module that initializes the various pointers, fields, flags, and the like upon initialization of parser 500; destination buffer copy pointer (dCopyPtr) 512 typically points to the next location in the destination buffer where data is to be moved from a source buffer; destination buffer length (dLength) 514 typically holds the length of data (e.g., number of bytes) from the source buffer that is to be copied to the destination buffer; start code field 516 typically receives sequential byte values from the source buffer and is used for detecting NALU start codes and, optionally, emulation prevention codes in the source buffer; shifter 518 is typically used for shifting values in start code field 516; comparator 520 is typically used for comparing the values in start code field 516 to valid start codes and/or emulation prevention codes, and may also be used for detecting the state of frame flag 306. When parser 500 is implemented in hardware (in whole or in part; e.g., as an electronic circuit, chip, hardware module, or the like), hardware registers or the like may be used to implement and/or store at last some of the various pointers, fields, flags, and the like illustrated in FIG. 5, and logic circuits or the like may be used to implement initializer 510, shifter 518, and/or comparator 520. Such a hardware parser may be considered a computing device.

Figure 6:
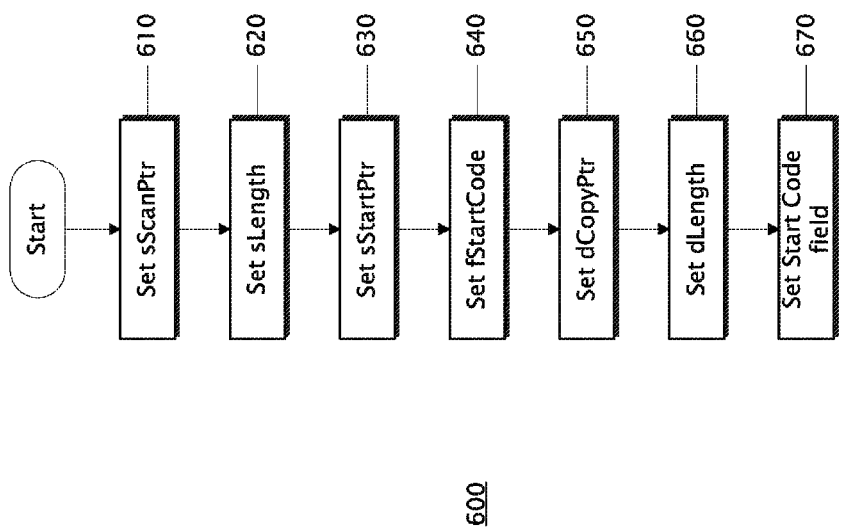

FIG. 6 is a block diagram showing an example method 600 for initializing various data elements of example parser 500 or the like. Method 600 may be performed by a parser implemented in hardware, software, or any combination of the two, and may be performed by example initializer 510 or the like. Method 600 typically begins at block 610 and may be performed in the order indicated or in some other order, and at least some of the steps may be performed at a different time than initialization time. Method 600 may also initialize other value or the like not shown, and/or not all of those shown.

Block 610 typically indicates initializing sScanPtr (e.g., 502). In one example, this includes setting sScanPtr to point to the beginning of a source buffer such as sBuffer 410 that may be provided by receiver 240 or the like.

Block 620 typically indicates initializing sLength (e.g., 504). In one example, this includes setting sLength to the length of the source buffer, where the length indicates the number of bytes of NALU data in the source buffer. The length of a start buffer may be as little as one byte.

Block 630 typically indicates initializing sStartPtr (e.g., 506). In one example, this includes setting sStartPtr to point to the beginning of the source buffer.

Block 640 typically indicates initializing fStartCode (e.g., 508). In one example, this includes setting fStartCode to indicate that the parser has not yet found a start code since being last initialized.

Block 650 typically indicates initializing dStartPtr (e.g., 512). In one example, this includes setting dCopyPtr to point to a destination buffer (e.g., dBuffer). Such a buffer(s) may be allocated at this time.

Block 660 typically indicates initializing dLength (e.g., 514). In one example, this includes setting dLength to zero to indicate that there is currently no NALU data in a source buffer to be copied to the destination buffer.

Block 670 typically indicates initializing start code field (e.g., 516). In one example, this includes setting each byte in start code 516 to some initialization value sufficient to not indicate a NALU start code. For example, each byte may be set to 0xFF or 0x00 or even to differing values so long as the value of the initialized start code field do not indicate a NALU start code.

NALU Parsing

Figure 7:
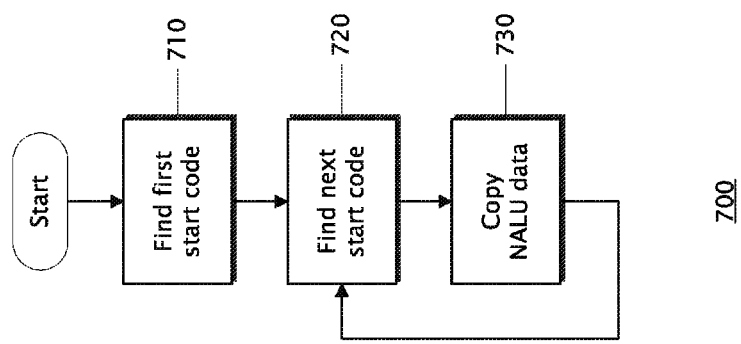
FIG. 7 is a block diagram showing an example generalized method that may be performed by a NALU parser.

FIG. 7 is a block diagram showing an example generalized method 700 that may be performed by a NALU parser, such as example parser 500. At a high level, a NALU parser scans data in a source buffer(s) to find NALU start codes, and copies each NALU to a destination buffer. In general, method 700 makes only a single pass over the data in the source buffer(s) and copies the NALU data only one time to a destination buffer(s). In one example, method 700 starts at block 710 with a pointer to a source buffer and a length of the source buffer.

Block 710 typically indicates scanning source buffer(s) until a first NALU start code is found. Each such source buffer may include as little as a single byte of data (i.e., be one byte in size). Such a first start code typically indicates the start of a first NALU. Once a first start code is found, method 700 typically continues at block 720.

Block 720 typically indicates scanning until a next NALU start code is found. Such a next start code typically indicates the start of a next NALU and also indicates the end of the previously-found NALU. Thus, at this point, the start and the end of the previously-found NALU have been identified, thus enabling copying of the previously-found NALU. Once a next start code is found, method 700 typically continues at block 730.

Block 730 typically indicates copying the previously-found NALU from a source buffer(s) to a destination buffer. In one example, the entire NALU may be copied in one copy step. In another example, portions of the NALU may be copied, each portion in its own copy step. In this example, the portions may be copied from one of more source buffers. Further, in some examples, the copying may include byte swapping and/or skipping. The amount of data copied may be one byte or more. Once the copying is complete, method 700 typically continues at block 720.

Figure 8:
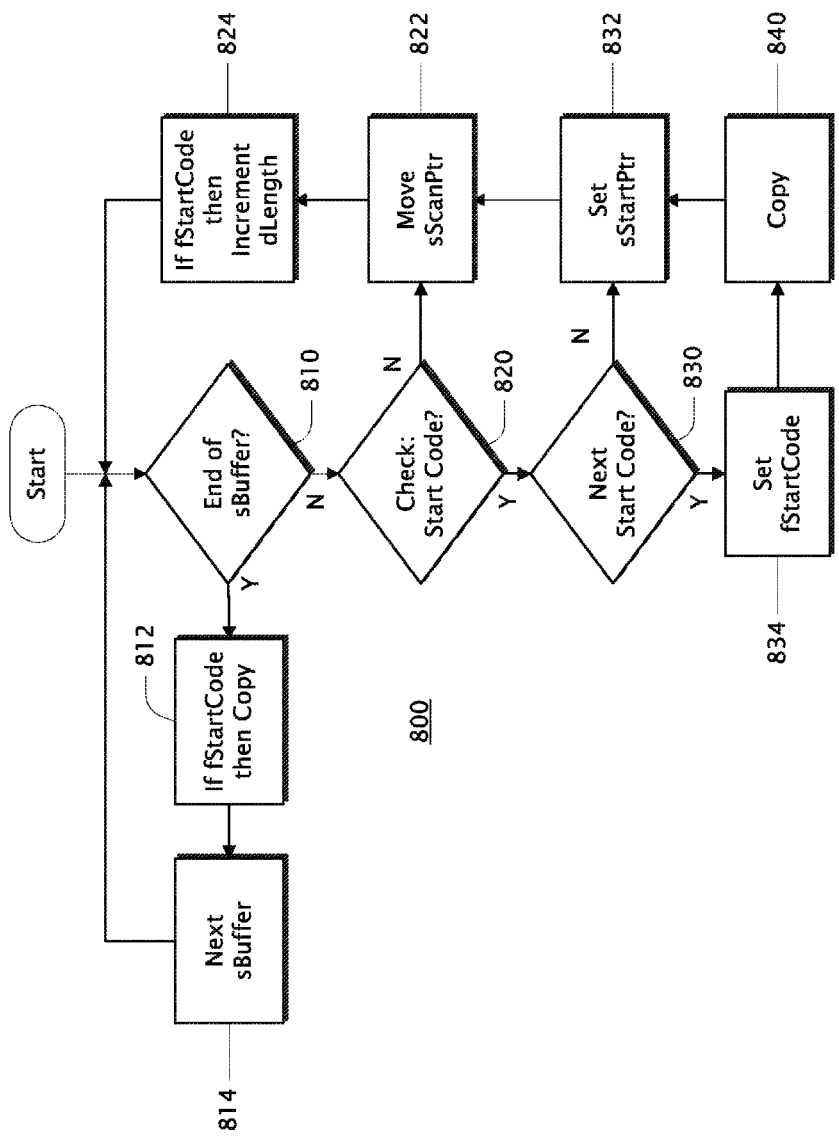
FIG. 8 is a block diagram showing an example method that may be performed by a NALU parser.

FIG. 8 is a block diagram showing an example method 800 that may be performed by a NALU parser, such as example parser 500. In general, method 800 includes scanning the data in the source buffer and copying any NALUs to destination buffers. The scanning is generally performed in a single pass over the data in a source buffer. The copying generally copies the NALU data only one time from a source buffer to a destination buffer(s). In one example, method 800 starts at block 810 with a pointer to a source buffer and a length of the source buffer.

Block 810 typically indicates determining whether or not the end of sBuffer has been reached during scanning. In one example, if sScanPtr points past the last byte of data in sBuffer, then the end of sBuffer has been reached. If the end of sBuffer has been reached, then method 800 typically continues at block 812, and otherwise at block 820.

Figure 11:
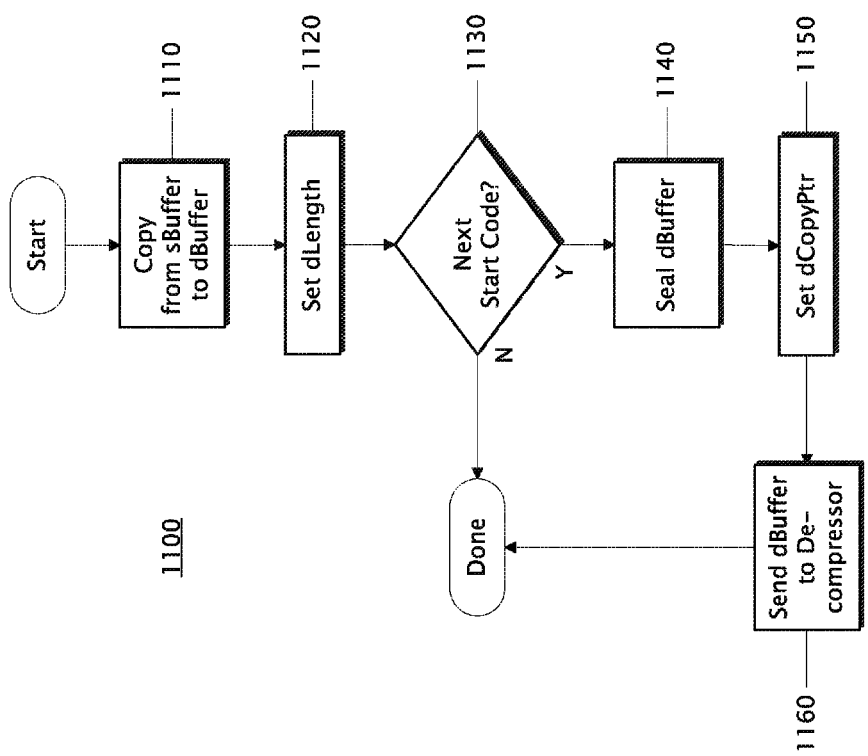
FIG. 11 is a block diagram showing an example method for copying NALU data to a destination buffer.
Figure 12:
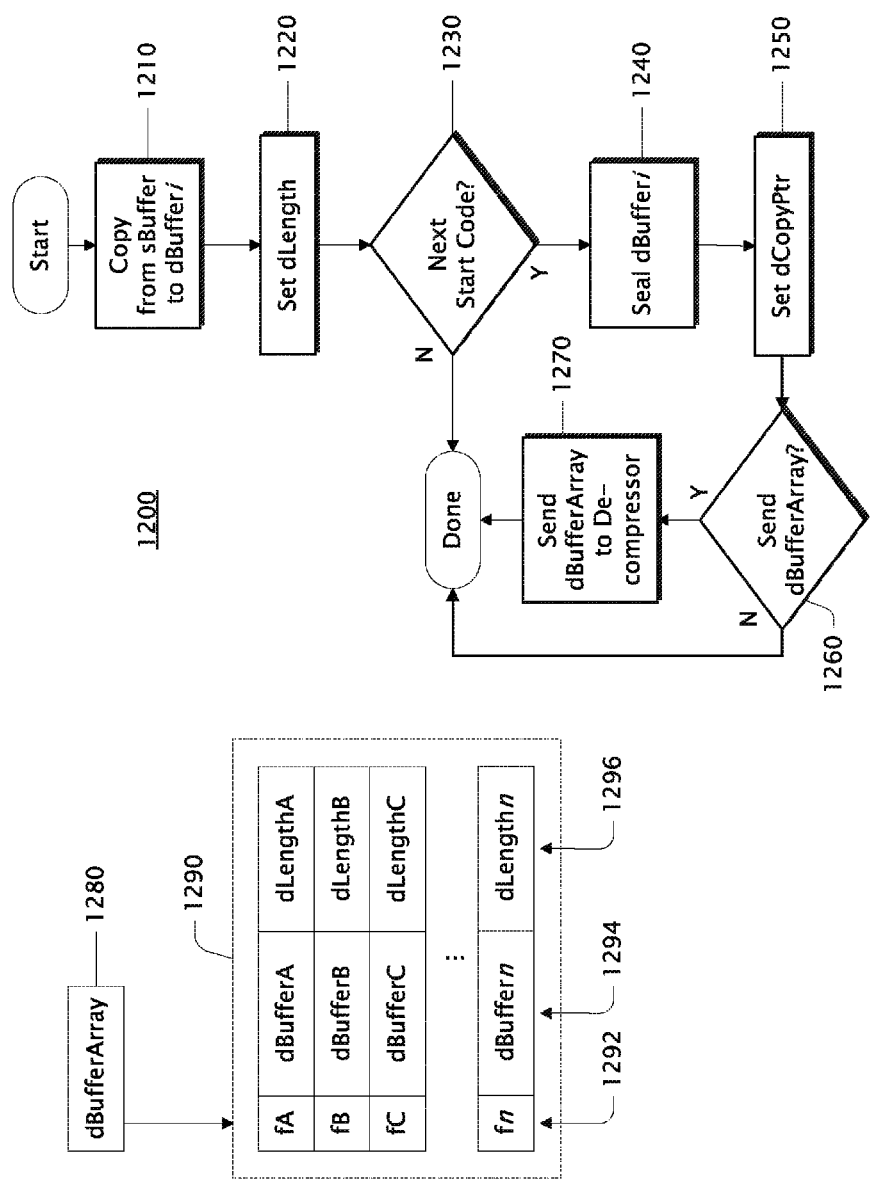
FIG. 12 is a block diagram showing an example method for copying NALU data to a destination buffer(s) of an array of destination buffers.

Block 812 typically indicates checking fStartCode (e.g., 508) to determine if at least one start code has been found during scanning since the parser was last initialized. If not, then method 800 typically continues at block 814. If at least one start code has been found, this typically indicates that sStartPtr points to the beginning of data that needs to be copied to dBuffer, dLength indicates the length of that data. Given the foregoing, the data is typically copied from sBuffer to dBuffer. Example methods 1100 or 1200 as illustrated in FIGS. 11 and 12 respectively may perform such copying. In another example, if data was previously copied, such as at block 840, then no further copying may be required at this step. Once any needed copying is complete, method 800 typically continues at block 814.

Block 814 typically indicates continuing the scanning in a new sBuffer. This is typically because the end of the previous sBuffer has been reached. In one example, as with the first sBuffer, this includes providing, e.g., by receiver 240 or the like, a pointer and length to the new sBuffer. Such a new buffer may be different from the previous sBuffer, or may be the same sBuffer filled with new NALU data. In one example, the same sBuffer is generally reused. Once the next sBuffer is selected and pointer and length are provided, some additional initialization may be performed according to method 900 shown in FIG. 9. Then method 800 typically continues at block 810.

Block 820 typically indicates checking for a start code (e.g., 302). In one example, this includes checking according to method 1000 shown in FIG. 10. If, based on the checking, a start code has been found, then method 800 typically continues at block 830, and otherwise at block 822.

Block 822 typically indicates moving sScanPtr (e.g., 506). In one example, this includes incrementing sScanPtr to point to the next location in sBuffer. In another example, sScanPtr may have already been incremented, and need not be incremented here, such as during copying data at block 840. Then method 800 typically continues at block 824.

Block 824 typically indicates determining if at least one start code has been found and, if so, incrementing dLength (e.g., 514). In another example, dLength may have already be set, and need not be set here, such as during copying data at block 840. Then method 800 typically continues at block 810.

Block 830 typically indicates determining if a next start code has been found. In one example, this includes determining if the start code found at block 820 is a start code that follows a previous start code. In one example, a next start code may be indicated by finding a start code (such as at block 820) in conjunction with the fStartCode flag indicating that at least one start code has already been found. If a next start code has been found, then method 800 typically continues at block 834, and otherwise at block 832.

Block 832 typically indicates setting sStartPrt (e.g., 506). In one example, this includes setting sStartPtr to point to the beginning of the start code found at block 820. In another example, this includes setting sStartPtr to point to the start of the data in sBuffer immediately following the start code found at block 820. In another example, this includes setting sStartPtr to point to a position in sBuffer immediately following data copied in a previous step, such as at block 840, if not already so set as part of the copying. Then method 800 typically continues at block 822.

Block 834 typically indicates setting fStartCode (e.g., 508). In one example, this includes setting the fStartCode flag to indicate that at least one start code has been found during scanning since the parser was last initialized. If fStartCode has already been so set then it need not but may be so set again. Then method 800 typically continues at block 840.

Block 840 typically indicates copying data from sBuffer to dBuffer. In one example, this includes incrementing dLength (e.g., 514) and copying dLength bytes of data from sBuffer starting at sStartPtr to dBuffer according to one of methods 1100 and 1200 as illustrated in FIGS. 11 and 12 respectively. Then method 800 typically continues at block 832.

Figure 9:
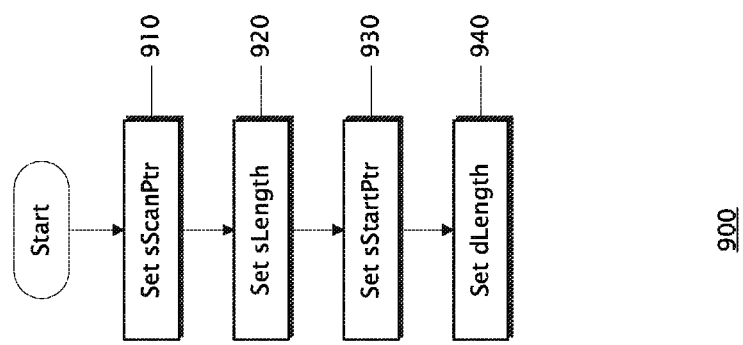
FIG. 9 is a block diagram showing an example method for initializing a NALU parser for a new source buffer.

FIG. 9 is a block diagram showing an example method 900 for initializing a NALU parser for a new source buffer. Method 900 may be performed by a parser implemented in hardware, software, or any combination of the two, and may be performed by example initializer 510 or the like. Method 900 typically begins at block 910 and may be performed in the order indicated or in some other order.

Block 910 typically indicates initializing sScanPtr (e.g., 502) for a new source buffer. In one example, this includes setting sScanPtr to point to the beginning of the new source buffer (such as sBuffer 410) that may be provided by receiver 240 or the like.

Block 920 typically indicates initializing sLength (e.g., 504) for the new source buffer. In one example, this includes setting sLength to the length of the new source buffer, where the length indicates the number of bytes of NALU data in the new source buffer.

Block 930 typically indicates initializing sStartPtr (e.g., 506) for the new source buffer. In one example, this includes setting sStartPtr to point to the beginning of the new source buffer.

Block 940 typically indicates initializing dLength (e.g., 514). In one example, this includes setting dLength to zero to indicate that there is currently no NALU data in a source buffer to be copied to the destination buffer.

Figure 10:
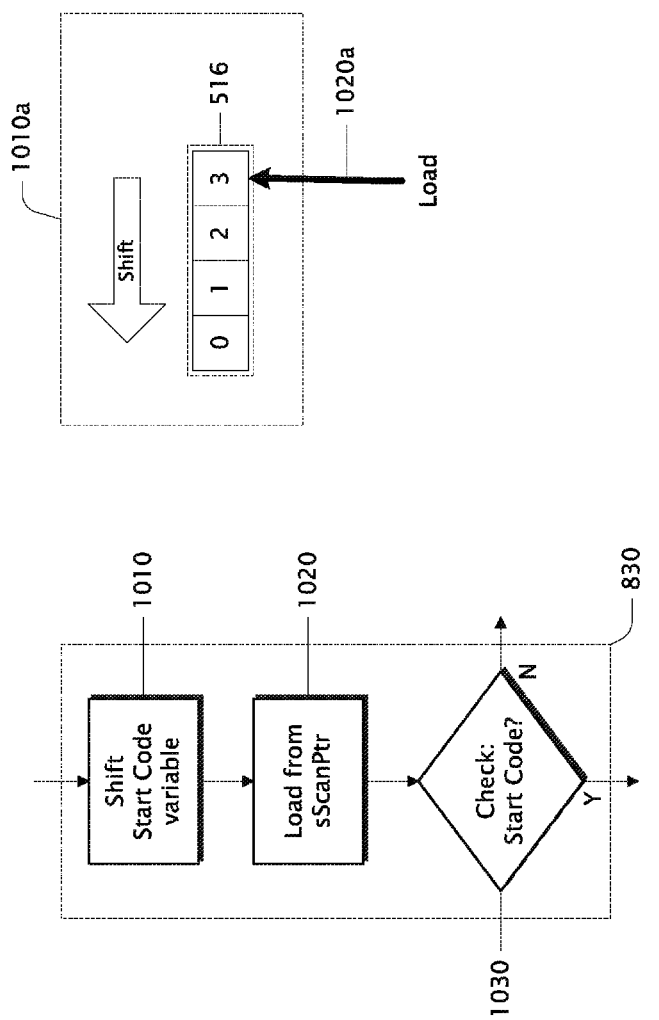
FIG. 10 is a block diagram showing an example method for checking for a NALU start code.

FIG. 10 is a block diagram showing an example method 1000 for checking for a NALU start code. Method 1000 is capable of detecting start codes even if a portion of a start code is located at the end of a source buffer and the remainder of the start code is located at the beginning of the next source buffer, a capability that facilitates the single pass/single copy characteristic of the parser. In one example, method 1000 represents step 830 of method 800. This checking may be performed on values copied from sBuffer to a start code field such as start code field 516. In this manner, a start code may be detected even if a portion is located at the end of a source buffer and the remainder is located at the beginning of the next source buffer. In one example, such as in a software implementation, start code field 516 is implemented in cache memory (as opposed to system memory or the like) where a processor(s) is able to perform operations on it at speeds exceeding those possible if it were maintained in system memory or the like. In another example, such as in a hardware implementation, start code field 516 is implemented in a hardware register or the like where operations are able to be performed on it at speeds exceeding those possible if it were maintained in system memory or cache memory or the like.

In one example, start code field 516 is four bytes in length, sufficient to hold a four byte start code (e.g., start code 302). In another example (not shown), start code field 516 is five bytes in length, sufficient to hold a four byte start code (e.g., start code 302) and a fifth byte that may include a frame flag (e.g., frame flag 306). Method 1000 typically begins at block 1010.

Block 1010 typically indicates shifting 1010a values in start code field 516. In one example, this includes shifting the byte value in slot 1 to slot 0, the byte value in slot 2 to slot 1, and the byte value in slot 3 to slot 2, in that order. Such shifting may be performed by shifter 518 or the like that may be implemented in hardware, software, or any combination of the two. In another example, the byte values in slots 1, 2, and 3 are copied to slots 0, 1, and 2 respectively, either in individual operations or all in one operation. Once the operation(s) indicated by block 1010 are complete, then method 1000 typically continues at block 1020.

Block 1020 typically indicates loading 1020a the next value from the source buffer into slot 3 of start code field 516. In one example, this includes loading the byte value pointed to by sScanPtr from sBuffer (e.g., 410) to slot 3 of start code field 516. Once the operation(s) indicated by block 1020 are complete, then method 1000 typically continues at block 1030.

Block 1030 typically indicates checking for a start code (e.g., 302). In one example, this includes comparing the values in start code field 516 to a valid start code (e.g., 302) to determine whether or not a start code has been found. In one example, such comparing may be performed by comparator 520 or the like. When performed by method 800, if a start code is found, then method 1000 may continue at block 834, and otherwise at block 832.

Optionally, method 1000 may also determine the value of a frame flag (e.g., 306) that may be located in the byte immediately following a found start code. In one example, such determining includes loading the byte value immediately after the start code from a source buffer into a field or register or the like and checking the frame flag. The frame flag may indicate that the NALU indicated by the found start code begins a new frame, or that the NALU indicated by the found start code is part of another frame. In one example, such information may be used when copying NALU data such as in described in methods 1100 and 1200 as illustrated in FIGS. 11 and 12 respectively.

Also optionally, method 1000 may check for an emulation prevention code (e.g., 310). Method 1000 is optionally capable of detecting emulation prevention codes even if a portion of an emulation prevention code is located at the end of a source buffer and the remainder of the emulation prevention code is located at the beginning of the next source buffer, a capability that facilitates the single pass/single copy characteristic of the parser. This checking may be performed on values copied from sBuffer to start code field 516 or the like, where these values may be the same values shifted and copied at blocks 1010 and 1020 for start code checking. In other words, the same values in start code field 516 may be check for a start code and/or an emulation prevention code. In this manner, an emulation prevention code may be detected even if a portion is located at the end of a source buffer and the remainder is located at the beginning of the next source buffer. In one example, such checking includes comparing the values in start code field 516 or the like to a valid emulation prevention code (e.g., 310) to determine whether or not an emulation prevention code has been found. In one example, such comparing may be performed by comparator 520 or the like. If an emulation prevention code is found, the third byte (byte i+2, typically with a value of 0x03, the "added value") is generally skipped so as to not be copied to the destination buffer. In one example, such skipping may be accomplished at this point during method 1000 by, if the fStartCode flag (e.g., 508) indicates that at least one start code has been found, copying the data starting at sStartPtr (e.g., 506) up to, but not including, byte i+2 of the found emulation prevention code from the source buffer to the destination buffer, then (after the copying is complete) setting sStartPtr to point to byte i+3 of the found emulation prevention code in the source buffer. In this example, the third byte (byte i+2, typically with a value of 0x03, the "added value") of the found emulation prevention code is skipped so as to not be copied to the destination buffer.

Method 1000 may also include checking for an indication of a frame boundary. In one example, when a start code is found, this includes checking the next byte in the start buffer (the byte immediately following the found start code) for an indication of a frame boundary. Such a detected frame boundary in a NALU typically indicates that it is the first NALU of a new frame. An indication of a frame boundary may be in the form of the value of a frame flag or the like, such as frame flag 306.

In one example, a frame boundary may be detected by checking the byte in the source buffer immediately following the found start code. In another example, once a NALU start code is found, the byte immediately following the start code in the source buffer may be read into a $5^{th}$ slot (not shown) of start code field 516 and then checking the value in the filled $5^{th}$ slot for an indication of a frame boundary.

FIG. 11 is a block diagram showing an example method 1100 for copying NALU data to a destination buffer. In general, method 1100 copies NALU data from the source buffer to the destination buffer only one time. Once the destination buffer is full (contains a NALU), then it may be made available to a de-compressor. Method 1100 typically begins at block 1110.

Block 1110 typically indicates copying NALU data from sBuffer to dBuffer. In one example, this includes copying dLength bytes of data starting at sStartPtr to the location in dBuffer pointed to by dCopyPtr. This also optionally includes changing the endianess of the NALU data as it is being copied, typically as required by the particular de-compressor that the copied NALU data will be processed by. Then method 1100 typically continues at block 1120.

Block 1120 typically indicates setting dLength (e.g., 514). In one example, this includes setting dLength to zero indicating that there are no more bytes to be copied at this time from sBuffer to dBuffer. Then method 1100 typically continues at block 1130.

Block 1130 typically indicates determining if a next start code has been found, such as at block 830. In one example, a next start code may be indicated by finding a start code (such as at block 820) in conjunction with the fStartCode flag (e.g., 508) indicating that at least one start code has already been found. If a next start code has been found, then method 1130 typically continues at block 1140, and otherwise method 1100 is typically complete.

Block 1140 typically indicates sealing dBuffer. In one example, this includes setting a flag corresponding to dBuffer that indicates that dBuffer now contains one NALU comprising dLength bytes of data (as indicated prior to dLength being set to zero). Then method 1100 typically continues at block 1150.

Block 1150 typically indicates setting dCopyPtr (e.g., 512). In one example, this includes setting dCopyPtr to point to the beginning of a new dBuffer. Such a new buffer may be different from the previous dBuffer, or may be the same dBuffer. In one example, the same dBuffer is generally reused. Once dCopyPtr is set, method 1100 typically continues at block 1160.

Block 1160 typically indicated sending dBuffer, or a reference to it, to a de-compressor (e.g., 252). Such a reference may include a pointer to the beginning of dBuffer and a length (in number of bytes) of the NALU data it contains. Then method 1100 is typically complete.

FIG. 12 is a block diagram showing an example method 1200 for copying NALU data to a destination buffer(s) of an array of destination buffers. In general, method 1200 copies NALU data from a source buffer(s) to destination buffer(s) only one time. In one example, NALU data may be copied to the destination buffers in the array such that the array comprises one frame's worth of NALUs. In another example, NALUs may be copied to the destination buffers in the array until each buffer in the array is filled. Once each destination buffer in the array is full (contains a NALU), then the array may be made available to a de-compressor. Method 1200 typically begins at block 1210.

In one example, a pointer such as dBufferArray 1280 points to the buffer array 1290. In this example, array 1290 comprises a data structure representing a plurality of destination buffers. Each such buffer is represented by a second data structure that includes a flag (e.g., fn 1292), a pointer to the buffer (e.g., dBuffern 1294), and a length of the data (number of bytes) copied into the buffer (e.g., dLengthn).

Initially, and after each (or all) sealed buffer(s) of an array is processed by a de-compressor or the like, the data structure is typically initialized such that the flags (e.g., 1292) are each set to indicate that its corresponding buffer does not include an entire copied NALU (and thus is unsealed), the pointers (e.g., 1294) are each set to NULL or to point to the beginning of a corresponding destination buffer, and the lengths (e.g., 1296) are each set to zero. Generally, destination buffers in the array are used in sequential order, starting with the first in the array (e.g., dBufferA). Each such buffer may be initially allocated prior to its first use or during the first initialization. Each buffer may be extended in length as required. In the description of the steps of method 1200 below, the index 'i' as used in "dBufferi" and "dLengthi" indicates the currently selected destination buffer and its length field in the array. The term "sealed" and the like as used herein generally indicates that a destination buffer contains an entire NALU that is ready to be sent to a de-compressor or the like. The term "unsealed" generally indicates that a destination buffer does not (yet) contain and entire NALU.

Block 1210 typically indicates copying NALU data from sBuffer to dBufferi. In one example, this includes copying dLength (e.g., 514) bytes of data starting at sStartPtr to the location in dBufferi pointed to by dCopyPtr (e.g., 512). This also optionally includes changing the endianess of the NALU data as it is being copied, typically as required by the particular de-compressor that the copied NALU data will be processed by. This may also include setting dLengthi (e.g., 1296i) to the number of bytes copied from sBuffer to dBufferi. Then method 1200 typically continues at block 1220.

Block 1220 typically indicates setting dLength (e.g., 514). In one example, this includes setting dLength to zero indicating that there are no more bytes to be copied at this time from sBuffer to dBuffer. Then method 1200 typically continues at block 1230.

Block 1230 typically indicates determining if a next start code has been found, such as at block 830. In one example, a next start code may be indicated by finding a start code (such as at block 820) in conjunction with the fStartCode flag (e.g., 508) indicating that at least one start code has already been found. If a next start code has been found, then method 1230 typically continues at block 1240, and otherwise method 1200 is typically complete.

Block 1240 typically indicates sealing dBuffer. In one example, this includes setting flag fi corresponding to dBufferi that indicates that dBufferi now contains one NALU comprising dLengthi bytes of data. Then method 1200 typically continues at block 1250.

Block 1250 typically indicates setting dCopyPtr (e.g., 512). In one example, this includes setting dCopyPtr to point to the beginning of the i+1 destination buffer in array 1290. If memory for the i+1 destination buffer has not yet been allocated, then the memory may be allocated and dBufferi+1 (e.g., 1294i+1) may be set to the beginning of the allocated memory. In general, once a destination buffer has been allocated it is reused to the greatest degree possible. Once dCopyPtr is set, method 1200 typically continues at block 1260.

Block 1260 typically indicates determining if array of destination buffers 1290, or a reference (e.g., dBufferArray 1280) to it, should be sent to a de-compressor (e.g., 252). In one example, if a frame flag (e.g., 306) associated with the found next start code (as determined at block 1230) indicates that the next start code is associated with a new frame, then method 1200 typically continues at block 1270, otherwise method 1200 is typically complete. Such frame boundary checking may be performed as described in connection with FIG. 10. In another example, if dBufferi indicates that last available destination buffer in array 1290, then method 1200 typically continues at block 1270, otherwise method 1200 is typically complete.

Block 1270 typically indicates sending dBufferArray (e.g., 1280) to a de-compressor (e.g., 252). Then method 1200 typically continues at block 1280.

Block 1270 typically indicates reinitializing destination buffer array 1290. In one example, this includes reinitializing the data structure of array 1290 such that the flags (e.g., 1292) are each set to indicate that its corresponding buffer does not include an entire copied NALU (and thus is unsealed), the pointers (e.g., 1294) are each set to point to the beginning of the corresponding destination buffer, and the lengths (e.g., 1296) are each set to zero. Then method 1200 is typically complete.

CONCLUSION

Following are a few non-limiting examples of various aspects of the technologies described herein.

In a first example, a method is performed on a computing device that includes at least one processor and memory, the method comprising: sequentially reading, by the computing device, one data unit at a time from at least one source buffer into a code field that is separate from the at least one source buffer and a destination buffer, where each one data unit is read only one time during the sequentially reading; finding, in the code field during the sequentially reading, a first code in the at least one source buffer and a second code in the at least one source buffer, where the first code and the second code are each more than one data unit in size; and sequentially copying data units from the at least one source buffer into the destination buffer, where the copying begins at a data unit corresponding to the first code in the at least one source buffer and ends with a data unit corresponding to the second code in the at least one source buffer, where, upon completion of the sequentially copying, the destination buffer contains one complete network abstraction layer unit ("NALU"), and where, upon completion of the sequentially copying, each copied data unit was copied only one time from the at least one source buffer to the destination buffer.

In a second example, a system comprising a computing device and at least one program module are together configured for performing actions, the computing device including at least one processor and memory, the actions comprising: sequentially reading, by the computing device, one data unit at a time from at least one source buffer into a code field that is separate from the at least one source buffer and a destination buffer, where each one data unit is read only one time during the sequentially reading; finding, in the code field during the sequentially reading, a first code in the at least one source buffer and a second code in the at least one source buffer, where the first code and the second code are each more than one data unit in size; and sequentially copying data units from the at least one source buffer into the destination buffer, where the copying begins at a data unit corresponding to the first code in the at least one source buffer and ends with a data unit corresponding to the second code in the at least one source buffer, where, upon completion of the sequentially copying, the destination buffer contains one complete network abstraction layer unit ("NALU"), and where, upon completion of the sequentially copying, each copied data unit was copied only one time from the at least one source buffer to the destination buffer.

In a third example, at least one computer-readable medium stores computer-executable instructions that, when executed by at least one processor of a computing device that includes memory, cause the computing device to perform actions comprising: sequentially reading, by the computing device, one data unit at a time from at least one source buffer into a code field that is separate from the at least one source buffer and a destination buffer, where each one data unit is read only one time during the sequentially reading; finding, in the code field during the sequentially reading, a first code in the at least one source buffer and a second code in the at least one source buffer, where the first code and the second code are each more than one data unit in size; and sequentially copying data units from the at least one source buffer into the destination buffer, where the copying begins at a data unit corresponding to the first code in the at least one source buffer and ends with a data unit corresponding to the second code in the at least one source buffer, where, upon completion of the sequentially copying, the destination buffer contains one complete network abstraction layer unit ("NALU"), and where, upon completion of the sequentially copying, each copied data unit was copied only one time from the at least one source buffer to the destination buffer.

In the first, second, and/or third examples, the sequentially copying is only performed in response to previously finding a NALU start code; and/or the sequentially copying skips copying each added value from the at least one source buffer of any found codes that are emulation prevention codes; and/or the first code is a NALU start code or an emulation prevention code, or the second code is the NALU start code or an emulation prevention code, or the finding further comprises detecting a frame boundary based on an indication in a payload of a NALU indicated by the NALU start code; and/or the data unit corresponding to the first code is a first data unit of a NALU start code or a data unit immediately following an added value of an emulation prevention code, or the data unit corresponding to the second code is a data unit immediately prior to a first data unit of a NALU start code or a data unit immediately prior to an added value of an emulation prevention code; and/or the first code or the second code is split across two or more consecutive source buffers of the at least one source buffer; and/or the sequentially reading comprises shifting data units in the code field prior to reading a next one data unit from the at least one source buffer into the code field.

In view of the many possible embodiments to which aspects of the technologies described herein and the forgoing examples may be applied, it should be recognized that the examples described herein are meant to be illustrative only and shall not be taken as limiting the scope of the technologies. Therefore, the technologies described herein contemplate all embodiments that may fall within the scope of the claims, and any equivalents thereto.

The invention claimed is:

1. A method performed on a computing device that includes at least one processor and memory, the method comprising:
    sequentially reading, by the computing device, one data unit at a time from at least one source buffer into a code field that is separate from the at least one source buffer and a destination buffer, where each one data unit is read only one time during the sequentially reading;
    finding, in the code field during the sequentially reading, a first code in the at least one source buffer and a second code in the at least one source buffer, where the first code and the second code are each more than one data unit in size; and
    sequentially copying data units from the at least one source buffer into the destination buffer, where the copying begins at a data unit corresponding to the first code in the at least one source buffer and ends with a data unit corresponding to the second code in the at least one source buffer, where, upon completion of the sequentially copying, the destination buffer contains one complete network abstraction layer unit ("NALU"), and where, upon completion of the sequentially copying, each copied data unit was copied only one time from the at least one source buffer to the destination buffer.

2. The method of claim 1 where the sequentially copying is only performed in response to previously finding a NALU start code.

3. The method of claim 1 where the sequentially copying skips copying each added value from the at least one source buffer of any found codes that are emulation prevention codes.

4. The method of claim 1 where the first code is a NALU start code or an emulation prevention code, or where the second code is the NALU start code or an emulation prevention code, or where the finding further comprises detecting a frame boundary based on an indication in a payload of a NALU indicated by the NALU start code.

5. The method of claim 1 where the data unit corresponding to the first code is a first data unit of a NALU start code or a data unit immediately following an added value of an emulation prevention code, or where the data unit corresponding to the second code is a data unit immediately prior to a first data unit of a NALU start code or a data unit immediately prior to an added value of an emulation prevention code.

6. The method of claim 1 where the first code or the second code is split across two or more consecutive source buffers of the at least one source buffer.

7. The method of claim 1 where the sequentially reading comprises shifting data units in the code field prior to reading a next one data unit from the at least one source buffer into the code field.

8. A system comprising a computing device and at least one program module that are together configured for performing actions, the computing device including at least one processor and memory, the actions comprising:

sequentially reading, by the computing device, one data unit at a time from at least one source buffer into a code field that is separate from the at least one source buffer and a destination buffer, where each one data unit is read only one time during the sequentially reading;

finding, in the code field during the sequentially reading, a first code in the at least one source buffer and a second code in the at least one source buffer, where the first code and the second code are each more than one data unit in size; and sequentially copying data units from the at least one source buffer into the destination buffer, where the copying begins at a data unit corresponding to the first code in the at least one source buffer and ends with a data unit corresponding to the second code in the at least one source buffer, where, upon completion of the sequentially copying, the destination buffer contains one complete network abstraction layer unit ("NALU"), and where, upon completion of the sequentially copying, each copied data unit was copied only one time from the at least one source buffer to the destination buffer.

9. The system of claim 8 where the sequentially copying is only performed in response to previously finding a NALU start code.

10. The system of claim 8 where the sequentially copying skips copying each added value from the at least one source buffer of any found codes that are emulation prevention codes.

11. The system of claim 8 where the first code is a NALU start code or an emulation prevention code, or where the second code is the NALU start code or an emulation prevention code, or where the finding further comprises detecting a frame boundary based on an indication in a payload of a NALU indicated by the NALU start code.

12. The system of claim 8 where the data unit corresponding to the first code is a first data unit of a NALU start code or a data unit immediately following an added value of an emulation prevention code, or where the data unit corresponding to the second code is a data unit immediately prior to a first data unit of a NALU start code or a data unit immediately prior to an added value of an emulation prevention code.

13. The system of claim 8 where the first code or the second code is split across two or more consecutive source buffers of the at least one source buffer.

14. The system of claim 8 where the sequentially reading comprises shifting data units in the code field prior to reading a next one data unit from the at least one source buffer into the code field.

15. At least one hardware computer-readable medium storing computer-executable instructions that, when executed by at least one processor of a computing device that includes memory, cause the computing device to perform actions comprising:

sequentially reading, by the computing device, one data unit at a time from at least one source buffer into a code field that is separate from the at least one source buffer and a destination buffer, where each one data unit is read only one time during the sequentially reading;

finding, in the code field during the sequentially reading, a first code in the at least one source buffer and a second code in the at least one source buffer, where the first code and the second code are each more than one data unit in size; and sequentially copying data units from the at least one source buffer into the destination buffer, where the copying begins at a data unit corresponding to the first code in the at least one source buffer and ends with a data unit corresponding to the second code in the at least one source buffer, where, upon completion of the sequentially copying, the destination buffer contains one complete network abstraction layer unit ("NALU"), and where, upon completion of the sequentially copying, each copied data unit was copied only one time from the at least one source buffer to the destination buffer.

16. The at least one hardware computer-readable medium of claim 15 where the sequentially copying is only performed in response to previously finding a NALU start code.

17. The at least one hardware computer-readable medium of claim 15 where the sequentially copying skips copying each added value from the at least one source buffer of any found codes that are emulation prevention codes.

18. The at least one hardware computer-readable medium of claim 15 where the first code is a NALU start code or an emulation prevention code, or where the second code is the NALU start code or an emulation prevention code, or where the finding further comprises detecting a frame boundary based on an indication in a payload of a NALU indicated by the NALU start code.

19. The at least one hardware computer-readable medium of claim 15 where the data unit corresponding to the first code is a first data unit of a NALU start code or a data unit immediately following an added value of an emulation prevention code, or where the data unit corresponding to the second code is a data unit immediately prior to a first data unit of a NALU start code or a data unit immediately prior to an added value of an emulation prevention code.

20. The at least one hardware computer-readable medium of claim 15 where the first code or the second code is split across two or more consecutive source buffers of the at least one source buffer, or where the sequentially reading comprises shifting data units in the code field prior to reading a next one data unit from the at least one source buffer into the code field.

* * * * *